United States Patent
White

(10) Patent No.: US 9,841,123 B1
(45) Date of Patent: Dec. 12, 2017

(54) CABLE TRAY SYSTEM

(71) Applicant: James C. White Company, Inc., Greenville, SC (US)

(72) Inventor: Thomas C. White, Greenville, SC (US)

(73) Assignee: James C. White Company, Inc., Greenville, SC (US)

(*) Notice: Subject to any disclaimer, the term of this patent is extended or adjusted under 35 U.S.C. 154(b) by 264 days.

(21) Appl. No.: 14/731,906

(22) Filed: Jun. 5, 2015

(51) Int. Cl.
*F16L 3/26* (2006.01)
*F16B 7/18* (2006.01)
*F16L 3/08* (2006.01)
*F16L 3/22* (2006.01)

(52) U.S. Cl.
CPC ...... *F16L 3/26* (2013.01); *F16B 7/18* (2013.01); *F16B 7/182* (2013.01); *F16L 3/08* (2013.01); *F16L 3/22* (2013.01)

(58) Field of Classification Search
CPC ....... F16L 3/26; F16L 3/08; F16L 3/22; F16L 7/18; F16L 7/182; F16L 3/01; F16L 5/00; F16L 3/085; F16L 3/10; F16L 3/221; F16L 3/222
USPC .......................... 248/58, 61, 59, 68.1, 49, 65
See application file for complete search history.

(56) References Cited

U.S. PATENT DOCUMENTS

| | | | | |
|---|---|---|---|---|
| 2,834,622 A | * | 5/1958 | Reeves | F16L 3/26 248/68.1 |
| 3,137,468 A | * | 6/1964 | Meinders | H02G 3/0437 248/49 |
| 3,432,128 A | * | 3/1969 | Elleboudt | F16L 3/26 211/195 |
| 3,618,882 A | * | 11/1971 | Podedworny | F16L 3/00 248/68.1 |
| 4,232,845 A | * | 11/1980 | Turner | F16L 3/26 174/101 |
| 4,432,519 A | * | 2/1984 | Wright | H02G 3/263 174/68.3 |
| 4,733,986 A | * | 3/1988 | Kenning | E04B 1/5812 403/306 |
| 5,067,678 A | * | 11/1991 | Henneberger | H02G 3/0608 248/58 |
| 5,580,014 A | * | 12/1996 | Rinderer | H02G 3/0456 174/68.1 |
| 5,639,048 A | * | 6/1997 | Bartholomew | F16L 3/26 248/49 |
| 6,313,405 B1 | * | 11/2001 | Rinderer | H02G 3/0456 174/68.3 |
| 6,498,296 B2 | * | 12/2002 | Benito-Navazo | H02G 3/0608 174/68.3 |

(Continued)

*Primary Examiner* — Nkeisha Smith
(74) *Attorney, Agent, or Firm* — Nexsen Pruet, LLC; Michael A. Mann

(57) ABSTRACT

A collection of components for a cable tray system provide the components and basic hardware for assembling and installing a cable tray that can change direction in three dimensions to avoid obstacles or other cables' trays while negotiating a designated space. Components of the cable tray system may be modular, that is, pre-configured for ease of assembly, such as vertical kits and horizontal bend kits, while others are supplied in lengths for cutting them to fit jobsite requirements, such as rails and rungs. Both components provide an inherent framework that facilitates conceptualization and construction of a cable tray system at the jobsite with flexibility and simplicity to allow the present cable tray system to be employed more efficiently and accurately.

21 Claims, 22 Drawing Sheets

(56) References Cited

U.S. PATENT DOCUMENTS

| | | | | |
|---|---|---|---|---|
| 6,547,192 | B2* | 4/2003 | Rinderer | H02G 3/0608 248/49 |
| 7,021,590 | B2* | 4/2006 | Hoffmann | F16B 7/0486 248/49 |
| 8,459,604 | B2* | 6/2013 | Smith | H02G 3/0608 248/300 |
| 8,573,409 | B2* | 11/2013 | White | H02G 3/0608 108/64 |
| 9,362,727 | B2* | 6/2016 | Cardin | H02G 3/0608 |
| 2002/0158169 | A1* | 10/2002 | Benito-Navazo | H02G 3/0608 248/49 |
| 2010/0133390 | A1* | 6/2010 | Lange | H02G 3/0608 248/65 |
| 2013/0240681 | A1* | 9/2013 | Woodlief | F16L 3/26 248/49 |
| 2014/0054425 | A1* | 2/2014 | Jang | H02G 3/263 248/49 |
| 2015/0233497 | A1* | 8/2015 | Lacey, Jr. | F16L 3/26 248/68.1 |
| 2016/0018026 | A1* | 1/2016 | Shelton | F16M 13/022 248/65 |

* cited by examiner

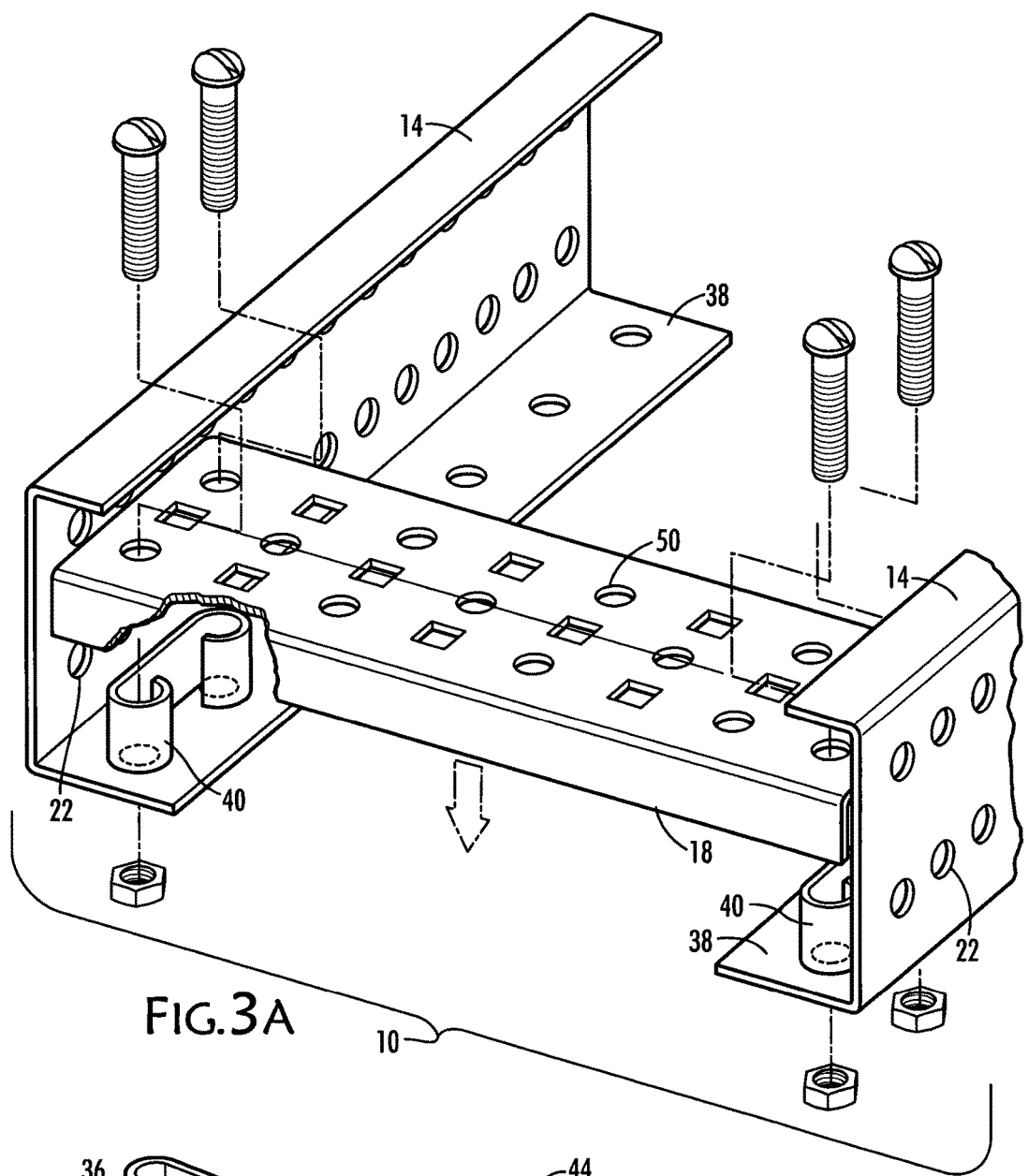
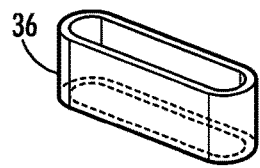
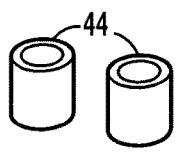
FIG.3A
FIG.3B
FIG.3C

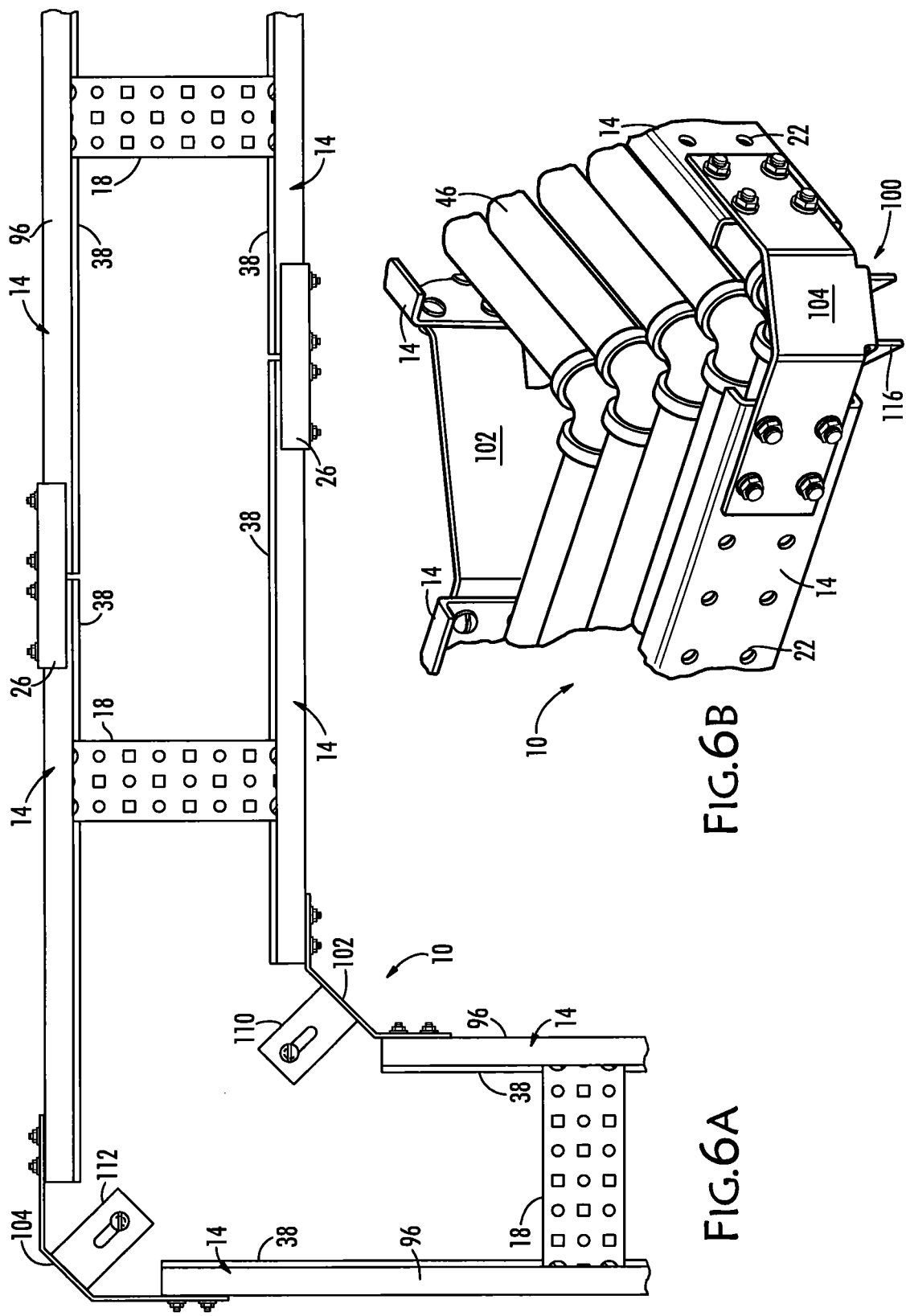

CABLE TRAY SYSTEM

PRIORITY CLAIM

None

BACKGROUND OF THE INVENTION

Cable trays (sometimes called cable races) are found in commercial and industrial facilities, power generation facilities, manufacturing plants, and the like. These trays and their related hardware are used to support, guide, contain, and help manage cables, tubes, pipes, conduits, and wires that must be run from one part of the facility or plant to another. Examples of cable trays may be found in U.S. Pat. No. 4,232,845, U.S. Pat. No. 3,137,468, U.S. Pat. No. 4,432,519 and U.S. Pat. No. 6,498,296, which are incorporated herein by reference.

The primary requirement for a completed cable tray system is structural rigidity. In many applications, the cable tray system is also designed to minimize or eliminate electrical arcing between connected parts of the system by maintaining electrically conductive continuity in the event that the system becomes electrically energized.

Cable trays typically are formed from linear runs of trays connected together to span the length of a facility. Sections of trays are fastened together to achieve the requisite length and shape. Occasionally, an entire cable tray may be installed in a straight line without interruption. More often than not, however, previously installed or permanent structures, such as support columns, walls, and other cable trays, are obstacles to the installation of a linear cable tray and therefore require a cable tray to negotiate its path around these other structures and depart from its otherwise straight-line trajectory. In some circumstances, a cable tray running from one location to another within a single facility may need to change direction and elevation perhaps more than once along its path.

Ladder-type cable trays are known. These are constructed from spaced-apart rails to which rungs are welded to form a "ladder-like" framework or section that will support cables with less material. The latter tray sections are shipped to the jobsite where they are connected together, section by section.

Designs may need to be carefully and accurately drawn out in advance to be sure that the cable tray layout for a facility will be installed efficiently and accurately.

Even when the cable tray design is complete, flexibility may still be needed during the installation process in the field to achieve a satisfactory outcome. Accordingly, it would be advantageous to have flexibility in cable tray design to accommodate real world applications.

SUMMARY OF THE INVENTION

The present cable tray system comprises a collection of components for designing and installing cable trays that accommodates changes in direction in up to three dimensions to avoid obstacles as it negotiates its way across a space. Importantly, the present cable tray system has sufficient capability and flexibility that it can be built on site, cutting certain components to fit as needed. Components of the present cable tray system include those that are modular, that is, they are pre-cut and formed for practically any directional change and support need by the cables to be run. It also includes those components that are most conveniently cut to fit at the job site. Importantly, many of the modular components "nest" with each other for more efficient packaging or banding, storage, inventorying, transportation, and staging. In addition and where possible, the basic components of the system are supplied in lengths that allow them to be spliced together and cut to fit precisely to thereby reduce the number of different components that have to be used to complete a cable tray.

The term cable tray is used herein to mean a long support for one or more cables between two points in space, which tray may change direction in three-dimensional space. The term tray is used generally and historically as a cable support but it does not mean the cable tray is a solid, continuous surface, only that it provides support underneath the cables.

This combination of pre-configured and job-site, cut-to-fit components form the basis of a cable tray system. Its kit-like nature and the specific features of its components enables the design of a cable tray system with the flexibility needed for real-world applications. Thus the present cable tray system may be used to design and install a wide assortment of three dimensional cable trays efficiently and accurately.

BRIEF DESCRIPTION OF THE DRAWINGS

In the figures,

FIGS. 3A, 3B, and 3C illustrate spacers in connecting rungs to rails, with FIG. 3A showing an exploded view of a rung between two rails with a spacer for elevating the rung from the ledges of the opposing rails, according to an embodiment of the invention, 3B illustrating an elongated closed spacer, and 3C illustrating individual tubular spacers, according to alternative embodiments of the present invention

FIGS. 6A and 6B illustrate top view and a top perspective view of a horizontal inside and an outside bend elbow joint with a diagonal rung for supporting pipes traversing a 90-degree horizontal bend, according to an embodiment of the invention;

FIG. 10C which shows two pipes or conduits secured by the second type of bracket.

DETAILED DESCRIPTION OF PREFERRED EMBODIMENTS

Figure 1:
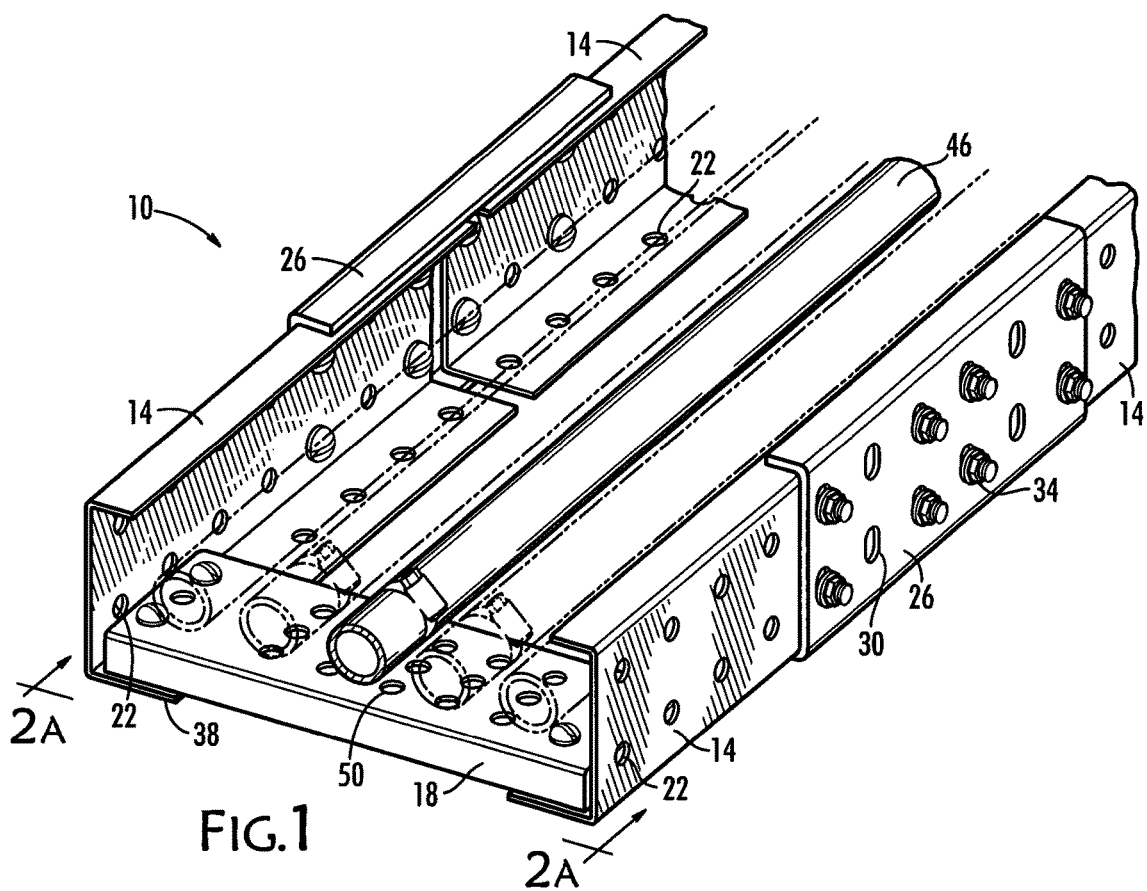
FIG. 1 illustrates in perspective a portion of a cable tray, according to embodiments of the invention.

The present invention is a cable tray system. The present cable tray system is useful for the design and installation of an elevated cable tray that crosses a space while avoiding other structures in that space as it runs from one part of that space to another. For example, when cables run from one or more buildings to another, more than one cable tray may be established to provide elevated, rigid paths for the cables and which cable trays avoid obstacles and each other as they cross that space, thereby protecting the cables while also keeping them organized during construction, verification, inspection, maintenance and repair.

By the term system, it is meant that the components cooperate with each other so that a designer and installer can design and install a cable tray meeting any of innumerable different requirements simply by selecting from among those components the number and size of components necessary and then cutting and connecting those components according to their nature, as described herein, to obtain the desired combination of straight runs and vertical, diagonal, and horizontal turns needed to cross that space without interference with existing obstacles and other cable trays. In a sense the present system can be used to specify a kit from which a specific cable tray design for a specific application can be assembled. That kit can be stored, shipped to the construction site, staged, and assembled. The system can be used to satisfy the specifications of an endless number of such kits for specific cable tray design requirements. Moreover, the various components of which the system is comprised are collectively designed to meet the needs of most cable tray requirements, to interconnect easily and rigidly, to store and ship compactly, and to allow flexibility in meeting real world requirements of the jobsite.

The term "cable" is used for convenience herein to represent any electrical, coaxial, and fiber optic wiring or cabling, as well as fluid hoses, conduit, piping and other tubular structures intended for delivery of fluids, gases, electrical current, and electrical and optical signals, including tubular structures reserved for future use.

The purpose of the cable tray is to protect cables from hazards and to organize the cables so that individual cables can be easily distinguished from each other, their paths more easily plotted, followed, and verified, and their servicing and repairing simplified.

FIG. 1 and FIGS. 2A, 2B, 2C, and 2D illustrate a section of cable tray, generally indicated by reference number 10 and three different rung and cable arrangements.

Cable tray 10 includes rails 14 and rungs 18 that may be fastened together in a configuration similar to a ladder. The ends of rungs 18 are attached at intervals to two opposing, spaced-apart rails 14. Rungs 18 are fastened along the axial length of rails 14 where and as needed to provide support for the cables running between rails 14, particularly near joints and near changes in direction in cable tray 10, and to provide a sufficiently rigid cable tray 10 for running across a space at elevation and unsupported. For a wider cable tray 10 to hold more and larger cables, for example, rungs 18 may be longer and wider and spaced closer together. Rails 14 may be L-shaped (as shown) or C-shaped for greater stiffness. Rungs 18 may be flat or channel rungs depending on the stiffness and strength needed for cable tray 10.

Rails 14 have plural holes 22 formed therein; rungs 18 have plural holes 50 formed therein to facilitate connection.

FIG. 1 also shows a pair of splice connectors 26, according to embodiments of the invention. Splice connectors 26 may be used wherever two successive rails 14 are to be joined end-to-end, and may not necessarily be used directly opposite another splice connector 26 on cable tray 10 as shown in FIG. 1, but rather wherever needed on either side of cable tray 10 as it negotiates the space required. Splice connectors 26 have plural holes 30 formed therein to facilitate connection with rails 14

Splice connectors 26 may have the same shape as rails (C-shape or L-shape) but be slightly larger in size than rails 14 so that rails 14 nest within splice connectors 26 as shown in FIG. 1. Nesting means that the splice connector 26 may be placed in engagement with a rail 14 so that there is full contact of the faces of rail 14 against the faces of the splice connector 26 despite bends formed in their engaging surfaces to form those faces. See also FIGS. 2A, 2B, and 2C, to see nesting of rails 14 inside splice connectors 26.

The ladder-type aspect of the present cable tray 10 is important from two standpoints. First, forming cable tray 10 from rails 14 and rungs at the jobsite provides complete flexibility in meeting the real world requirements. Rungs 18 are cut from rung material to be as long as the cable tray 10 needs to be wide; rails 14 may be cut from rail material or spliced as shown in FIG. 1. Second, the shipping, storing, and staging of components for cable tray 10 are much smaller when the individual components are not bulky. Accordingly, the additional assembly time is offset by reduced waste and lower shipping, storage and staging costs.

Rungs 18 are relatively short compared to rails 14 to which they are attached. Rail material may be provided in standard lengths, such as 6 m (20 feet). Rung material may also be provided in 3.6 m lengths (12 feet). Rail material and rung material are easily shipped in banded bundles.

Accordingly, rung material is divisible into rungs 18, which are lengths of formed metal or other rigid, structural material. Rail material may be used without dividing it if cable tray 10 runs far enough without change in direction, or it may be cut as needed. The rail material may not be the same type of material as the rung material.

Another aspect of the present cable tray 10 is that individual cables can be turned 90 degrees horizontally or vertically between rungs 18 from an initial direction. A tray-like cable tray simply does not permit that flexibility and a ladder-type cable tray has rungs welded in place, which rungs may be in a location where the installer needs to run a cable. In the present cable tray 10, rungs 18 may be placed where needed or convenient thereby providing additional flexibility in having cables on cable tray 10 diverge from the primary path to pass between the rungs 18.

The coordination of the holes in rails 14, rungs 18 and splice connectors 26 is an important feature of the present invention. In connecting rungs 18 to rails 14 and splice connectors 26 to rails, holes 22, 50, 30 of rails 14, rungs 18, and splice connectors 26, respectively, may be brought into registration so that two holes in each component align with two holes in the other, forming a registration pair. Bolts 34 are used to join rungs 18 to rails 14 and splice connectors 26 to rails 14 by being inserted into the registration pairs and tightened with nuts. Rungs 14 are joined to rails 14 by aligning the holes in ledges 38 and tightened with pairs This feature also includes fastening splice connectors 26 by aligning their holes 30 with the holes 22. Holes 30 may be elongated to facilitate alignment and connection. See also FIG. 2A.

Figure 2A:
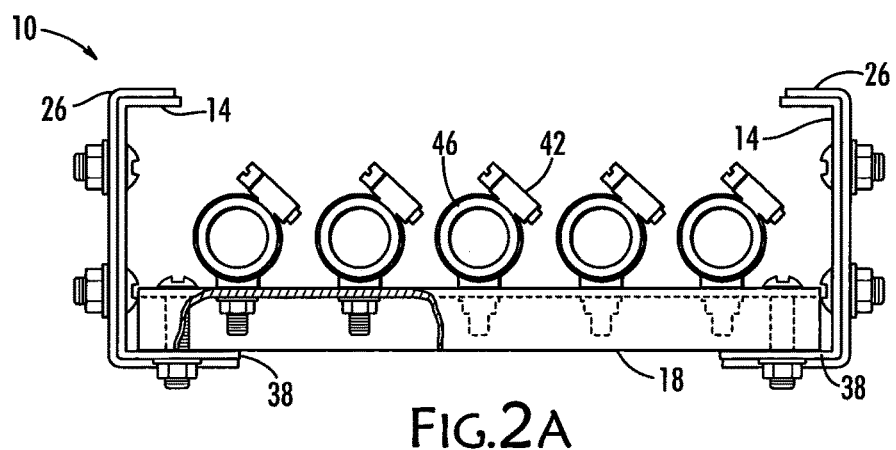
FIGS. 2A, 2B, 2C and 2D illustrate an end view of a cable tray, including FIG. 2A showing a rung attached inside the rail with the rung partially cut away to show one type of clamp holding two of the pipes to the rung, FIG. 2B showing a similar rung attached below the rails, FIG. 3C showing an alternative flat rung, and FIG. 2D showing a cable tray with channel rung on its ledges and with a large number of cables carried thereon, according to embodiments of the present invention.
Figure 2B:
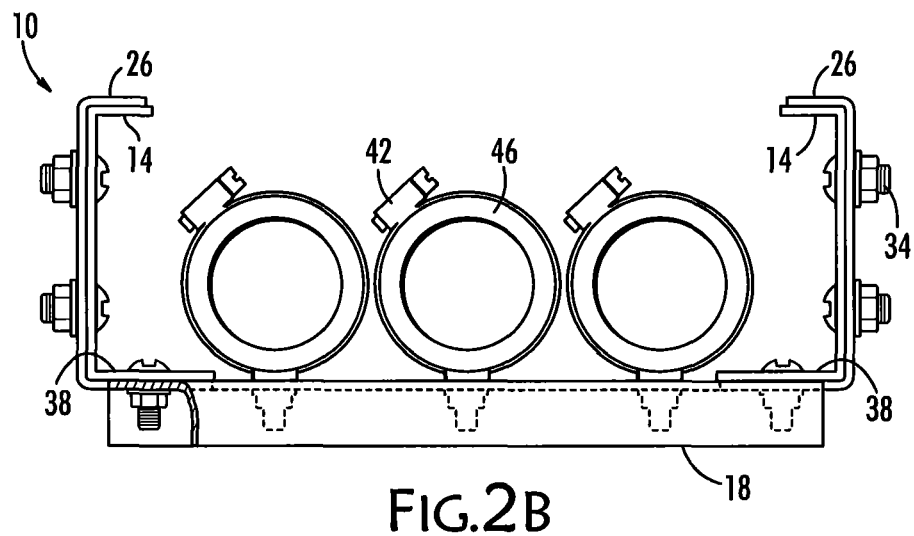
Figure 2C:
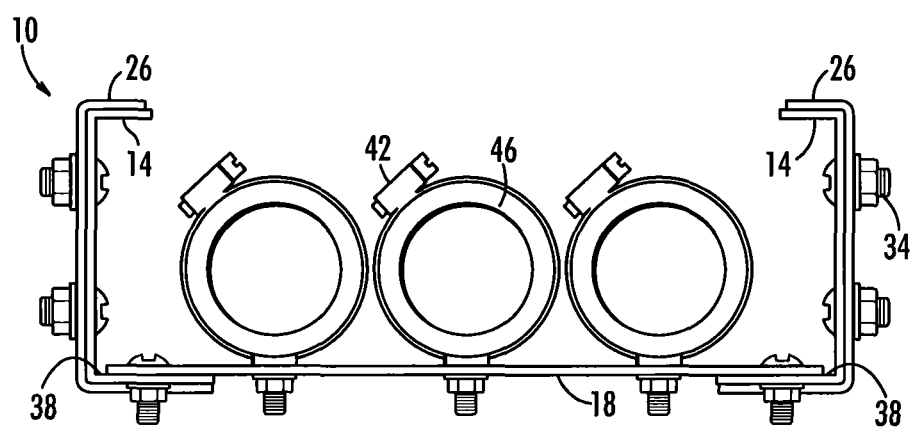
Figure 2D:
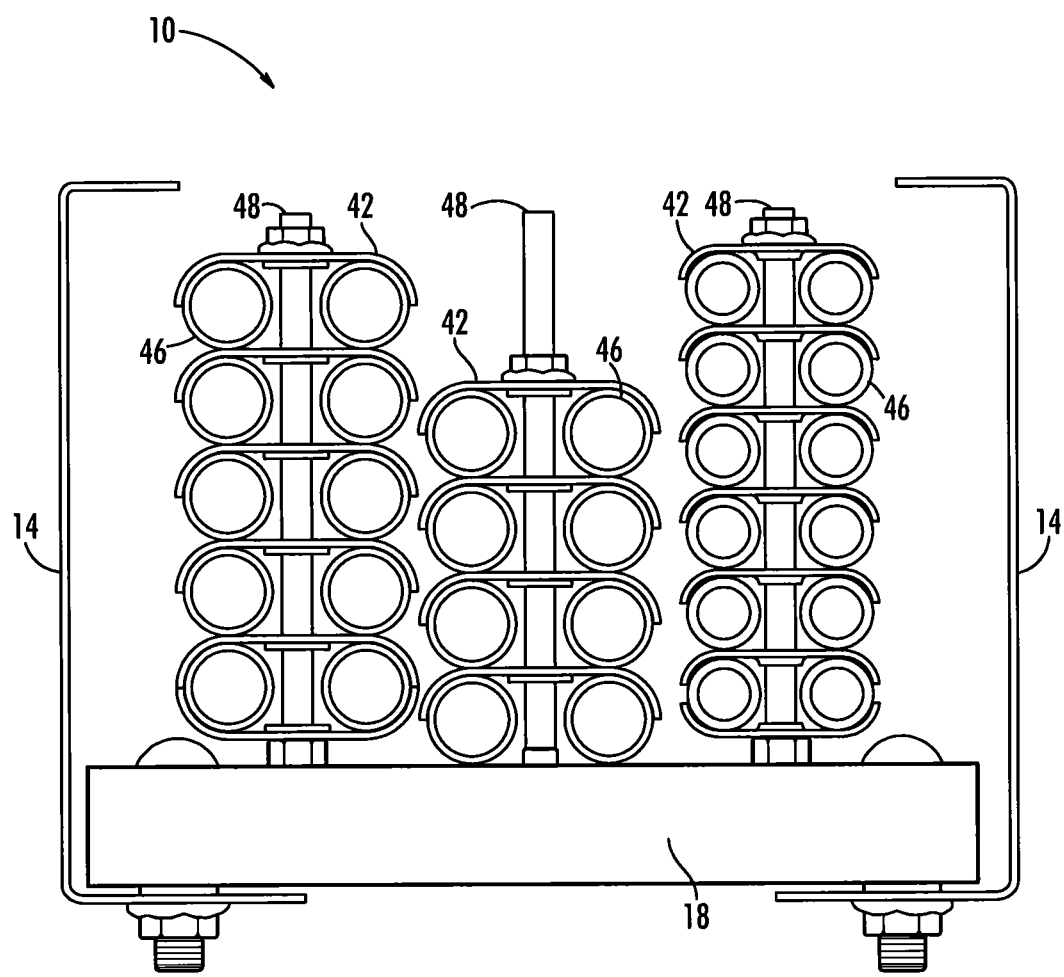

Rungs 18 may be fastened below (as shown in FIG. 2B) or inside of rails 14 (as shown in FIGS. 2A, 2C, and 2D). Whether rails 14 are L-shaped or C-shaped, opposing rails 14 have ledges 38 of the bottoms of the L or C that extend toward each other when rails 14 are aligned for assembling a cable tray 10 in order to provide two parallel, co-planar surfaces for rungs 18 to be attached by fasteners such as bolts. Other components may be also supported like rungs 18 by rails 14, such as struts, which are known in the prior art. FIG. 1 and FIG. 2A show rungs 18 fastened on tops of ledges 38 of opposing rails 14 and to the underside of opposing rails 14. FIG. 2B shows a rung 18 fastened to the bottoms of ledges 38 of opposing rails 14. FIG. 2C shows a flat rung 18 supported by two opposing rails 14.

FIG. 2D shows a rung 18 fastened to the top of ledges 38 of two spaced-part rails 14 using bolts 48 to stack cables 46 held in place by cable clamps 42. FIG. 2D illustrates the capacity of the present cable tray 10 to hold a large number of cables 46 in an organized fashion so that they can be traced easily in installation and maintenance.

FIGS. 3A, 3B, and 3C illustrate spacers used in positively connecting rungs 18 to rails 14. FIG. 3A illustrates rung 18 supported by the ledges 38 of two opposing rails 14 on spacers 40. Spacer 40 is a piece of flat metal stock rolled on its opposing ends into a "C" shape, as shown in FIG. 3A, or a spacer may be in the form of elongated loop 36, as shown in FIG. 3B, or two separate cylinders 44, as shown in FIG. 3C, any of which can receive the shafts of two bolts. Spacer 40 assures good physical and positive metal-to-metal contact between rails 14 and rungs 18, provides a good structural connection between rungs 18 and rails 14 and provides for clearance to access the bottom of rung 18 and ledge 38 of rail 14.

FIGS. 2B-2D and FIGS. 10A-10C show clamps 42 for securing a cable 46 to a rung 18. A clamp 42 is fastened to rung 18 and, with cable 46 thus held in place, clamp 42 is tightened to rung 18 to secure cable 46. Clamp 42 is not a component of the present system but may be any one of numerous clamps for holding cable 46 to a cable race surface. Indeed, the pattern of holes 50 in rung 18 of the present invention (See FIGS. 9A-9G) is intended to accommodate various standard cable clamps and supports. The coordination of the pattern of holes 50, generally round holes, as shown in this example, which provides for the great flexibility provided in combining the components of the present invention to accommodate a large number of designs possible for cable tray 10. By coordination of the holes 50, it is meant that at least two holes 50 on every rung 18 are spaced apart by the same distance as two or more holes 22 on every rail 14 and on every other component that a rail 14 would be connected to, such as a splice connector 26. Similarly, two or more holes would be spaced apart by the same distance on any other two components that maybe joined, so that such holes on different components may be form alignment pairs so that fasteners may be inserted through the alignment pairs of the components placed in engagement with each other. Furthermore, at least two holes on every component that may be joined to any other component are spaced apart from other structures carried on that same component that might otherwise interfere with the joining of two different components.

Rungs 18 provide sufficient support when properly spaced-apart for supporting cables 46. Rails 14 support rungs 18 and cooperate with each other to establish a sufficiently rigid and relatively light-weight structure to support a run of plural cables 42. The height of rails 14 may be the same on both sides of cable tray 10 or greater on one side of a cable tray 10 depending on the number of cables being supported and the number of layers of cables on each cable tray 10.

Rungs 18, as with rails 14, have an array of holes 50 formed therein for use in attaching cable clamps 42, as best seen in FIG. 9A-9G. Holes 50 in rungs 18 may be made in various patterns and include round holes and square holes, perhaps in an alternating array of square holes and round holes. Importantly, in every set of holes perpendicular to the long dimension of the rungs 18, there are at least two round holes spaced apart by 5 cm (2 inches) center-to-center. Accordingly, when a rung 18 is cut, both of its ends will have those two, 5 cm sp to aced-apart, round holes. While the 5 cm spacing is arbitrary, it is compatible with the pattern of holes 22 in the ledges 38 of rails 14 and with cable and hose clamps commonly used with cable trays, so it is preferred.

Figure 4A:
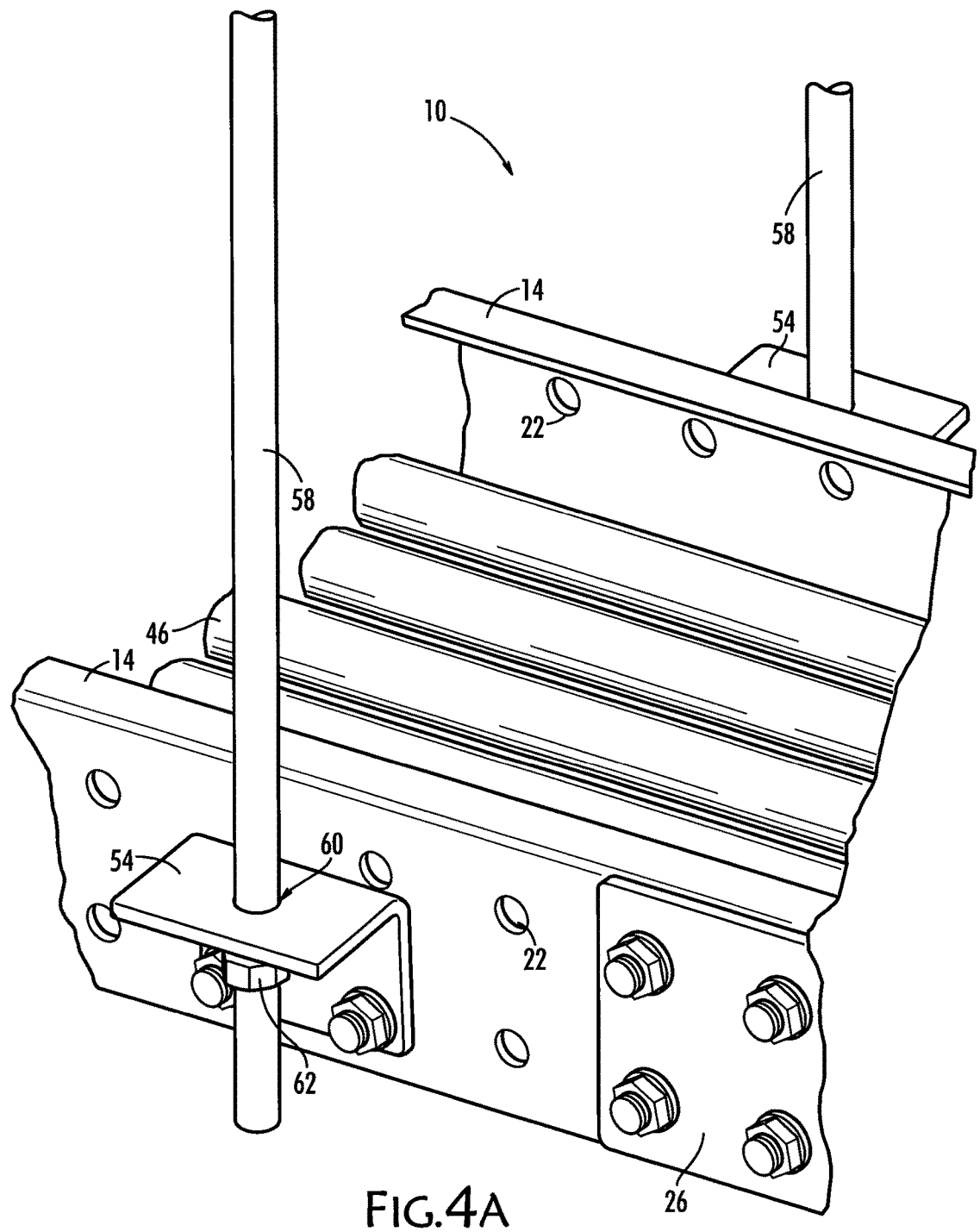
FIGS. 4A-4C illustrate in perspective different mounting devices for cable trays, namely, a hanger bracket is shown in FIG. 4A, a turn-out hold down mount is shown in FIG. 4B, and a turn-in hold down mount is shown in FIG. 4C, according to embodiments of the invention.
Figure 4B:
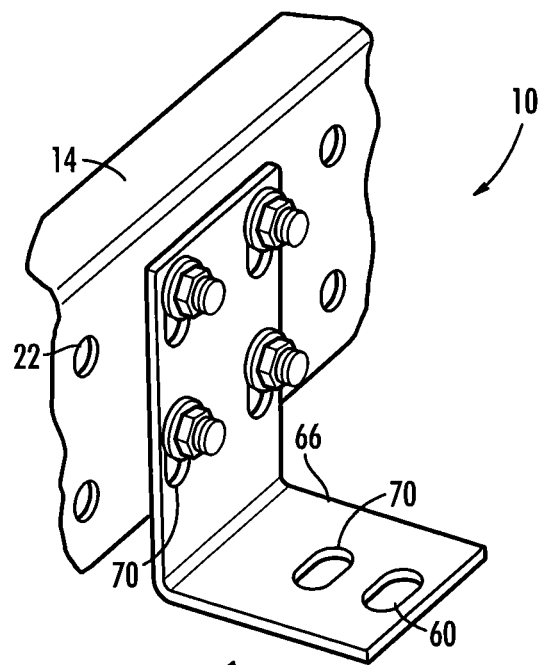
Figure 4C:
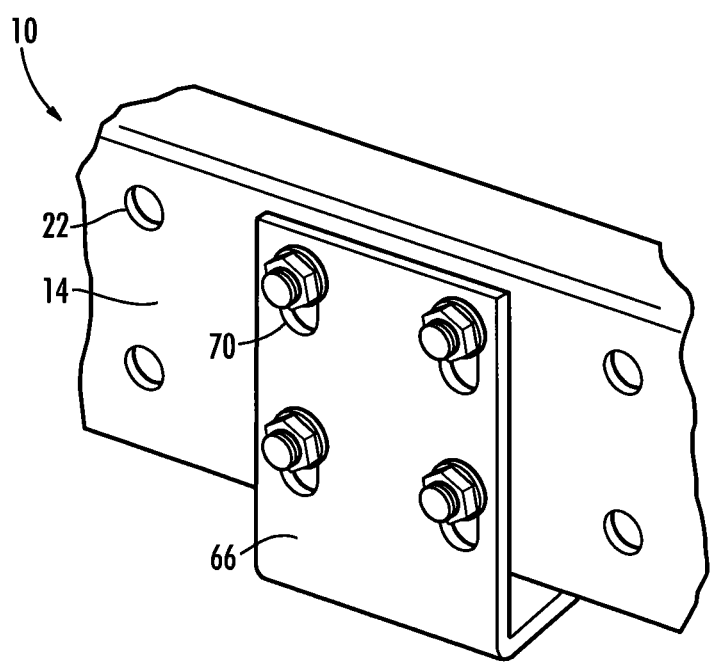

Cable tray 10 is supported at elevation by other structures, such as columns, the ceiling, the floor, walls or installed supports in the space where cable tray 10 is to be constructed. FIGS. 4A, 4B, and 4C show different brackets used for providing cable tray 10 support. FIG. 4A, for example, is a hanger bracket 54 which receives a rod 58 through a hole 60 in bracket 54. Rod 58 is attached overhead and threaded on its distal end to receive a nut 62 that will enable bracket 54 to hold rail 14 at the appropriate elevation from the overhead support.

FIGS. 4B and 4C show a support bracket 66 turned outside of rail 14 in FIG. 4B and turned inside of rail 14 of cable tray 10 in FIG. 4C. Support bracket 66 may be bolted to rails 14 through holes 22 in the same manner that splice connectors 26 are attached to rails 14. Support brackets 66 have holes 70, preferably oblong holes 70, for adjustability and ease in leveling cable tray 10 once brackets 66 are attached to support structures.

For 90-degree vertical bends in cables 46, two alternative embodiments of components, referred to as fitting kits, are shown. Each of these two vertical fitting kits has symmetric left and right sides that have a generally L-shape. The left and right sides of each fitting kit may be fastened by bolts to a first set of opposing rails 14 oriented vertically and to a second set of opposing rails 14 oriented horizontally so that the ends of two successive rails 14 are joined at right angles.

Figure 5A:
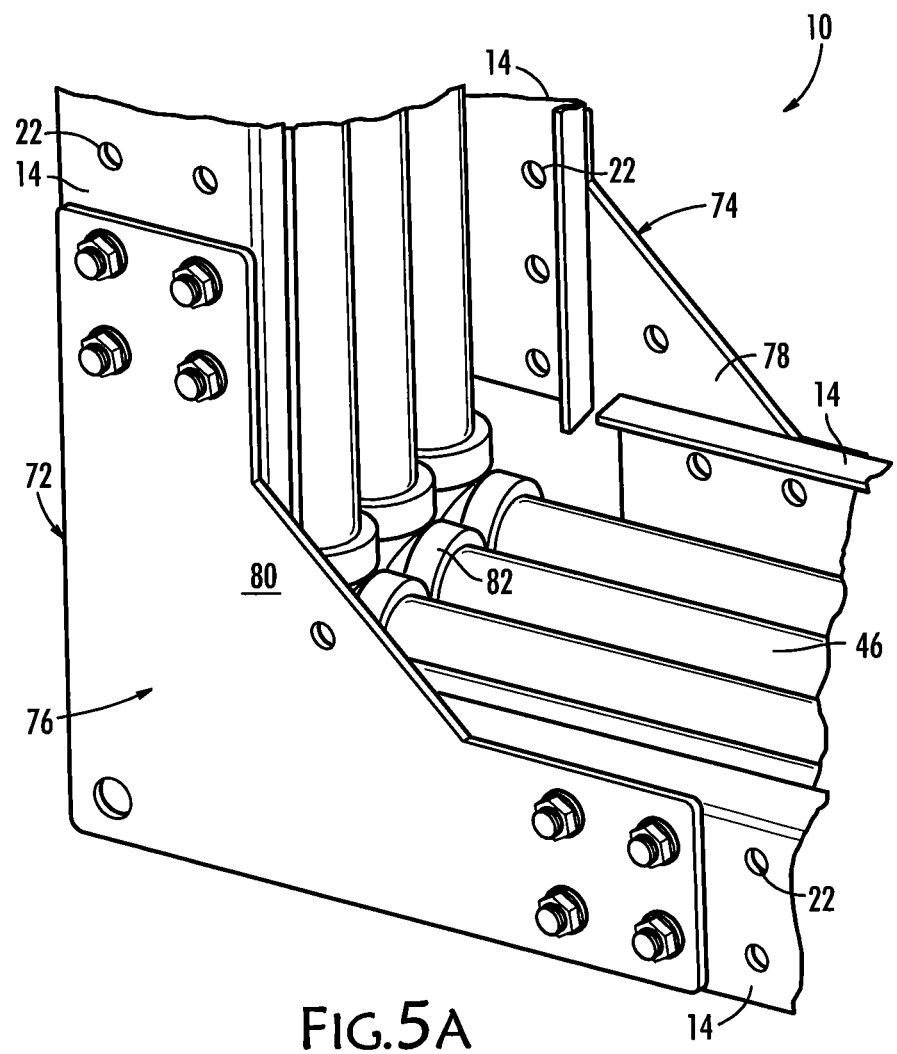
FIGS. 5A, 5B and 5C illustrate in perspective three alternative vertical fitting kits, a first vertical fitting kit for a 90-degree vertical elbow joint shown in FIG. 5A, a second vertical fitting kit for a radius bend shown in FIG. 5B, and a third vertical fitting kit in FIG. 5C show without cables so its rungs can be easily seen, according to embodiments of the invention.

In the embodiment of a first vertical fitting kit 72 shown in FIG. 5A, left and right sides 74, 76, although generally L-shaped, have gussets 78, 80, respectively, for confining the cables 46 connected by elbow joints 82 through the 90 degree bend and added strength. Left and right sides 74, 76 are flat so as to occupy less room in storing and shipping than pre-manufactures elbow. The horizontally-oriented and vertically-oriented rails 14 are relatively close to the center of the bend to provide a smaller gap for elbow joints 82. Rungs 18 may be installed closer to the bend formed by left and right sides 74, 76, of first fitting kit 72 if added rigidity and strength at these bends is needed.

Figure 5B:
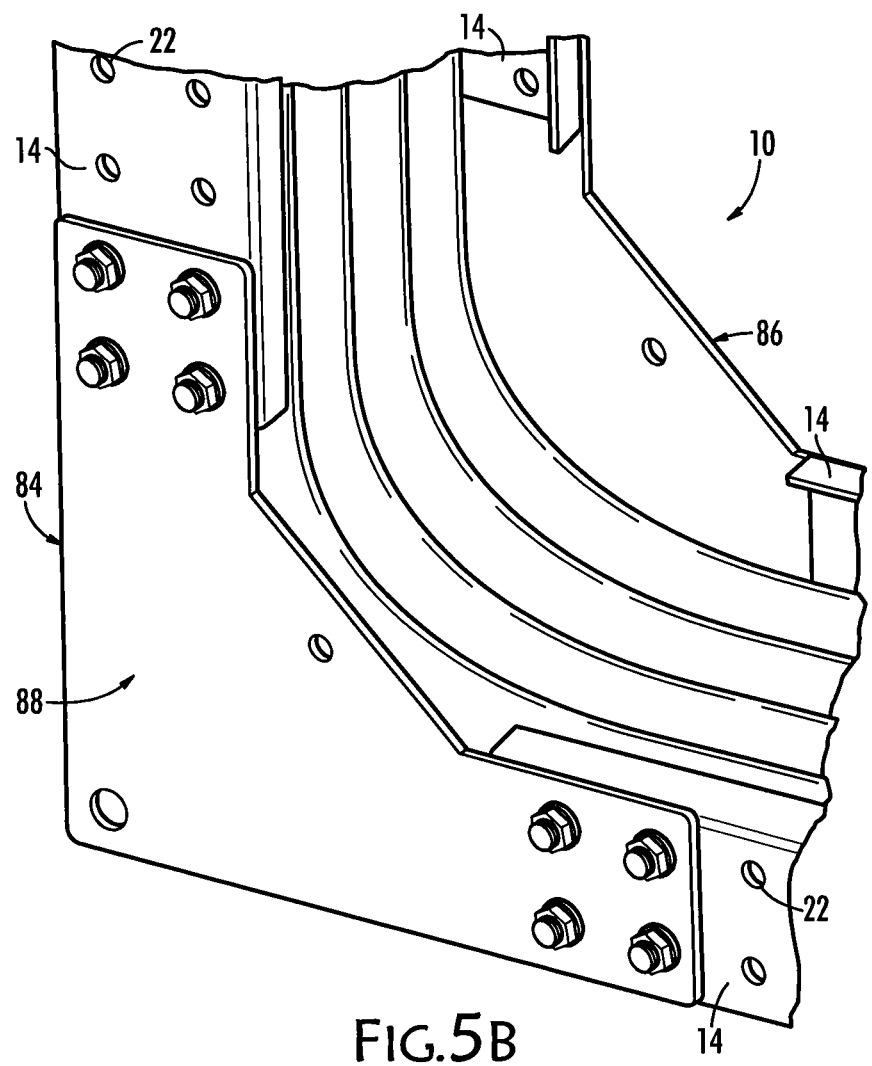

FIG. 5B shows a similar, second, fitting kit 84 that accommodates a 90 degree radius bend in cables 46 between a left side 86 and a right side 88. Accordingly, the vertical and horizontal rails 14 are attached to left and right sides 86, 88, of second fitting kit 84 farther from the center of the bend than in first fitting kit 72.

Figure 5C:
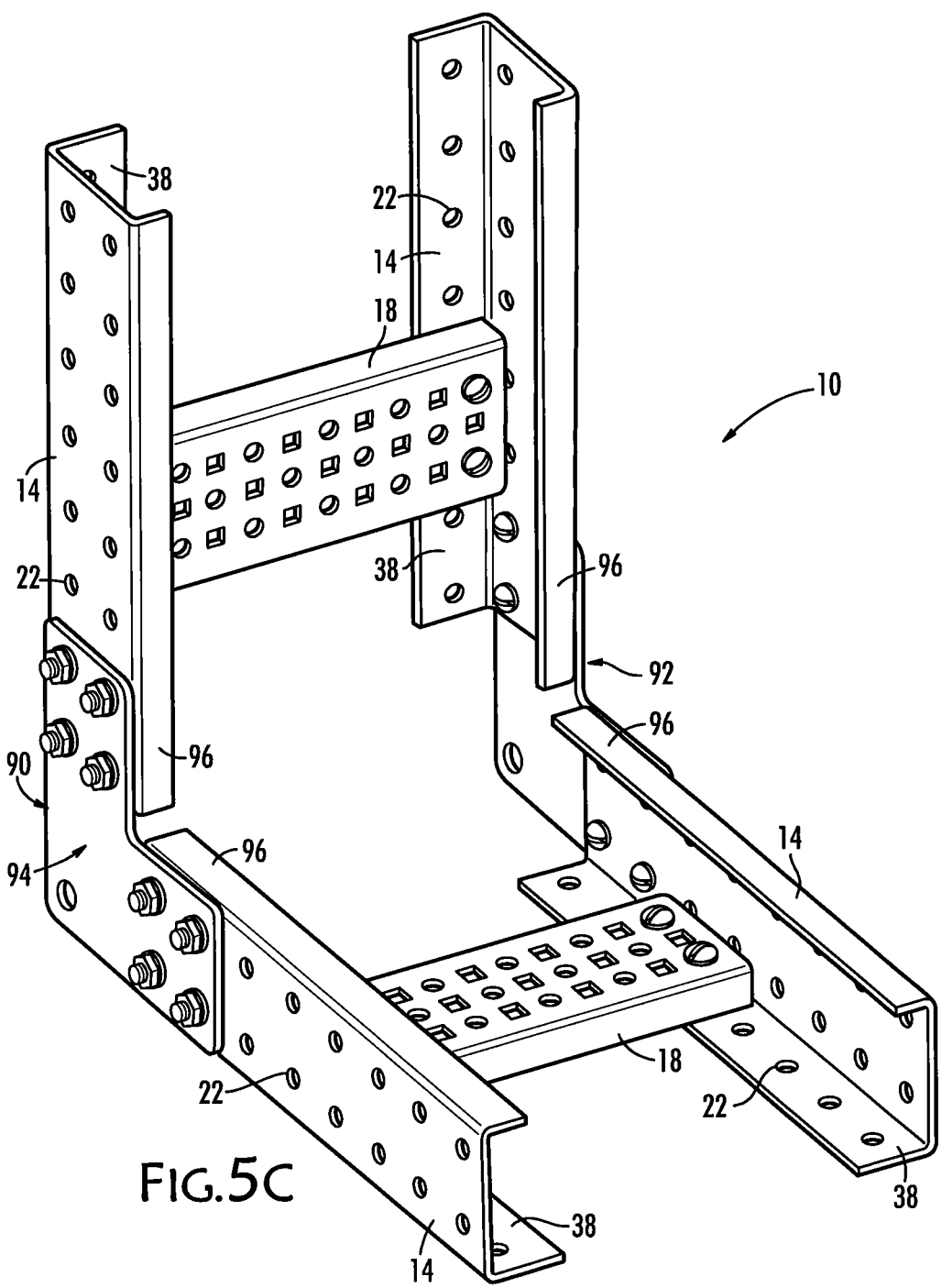
Figure 10A:
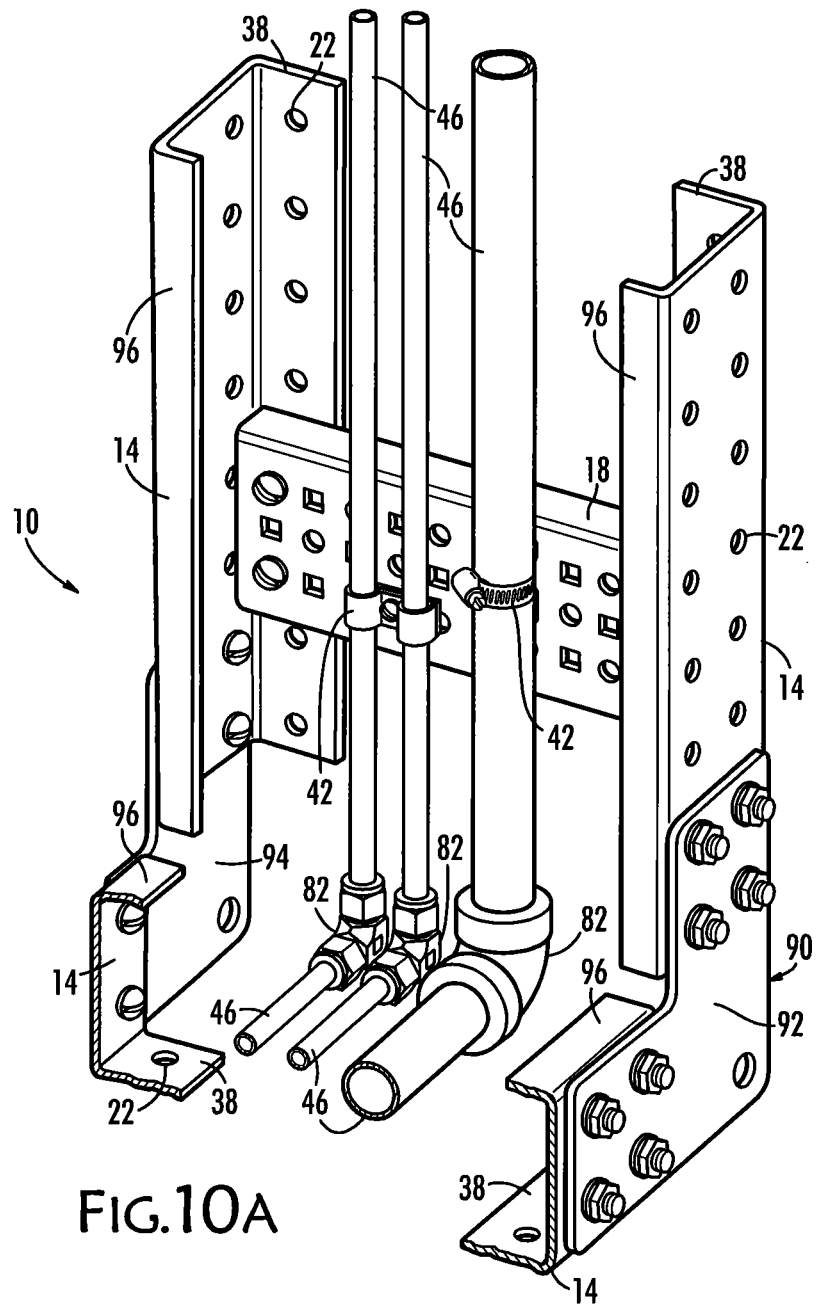
FIGS. 10A, 10B, and 10C show cable brackets, namely, FIG. 10A which shows a perspective view of a section of cable tray in a 90 degree vertical bend with three types of conduit or piping held by two clamps to a rung, FIG. 10B which shows in more detail a pipe or conduit secured by the first type of bracket.

In FIG. 5C and FIG. 10A, a third fitting kit 90 is shown, also, as with second fitting kit 84 without a gusset. Third fitting kit 90 has a left side 92 and a right side 94 and shows horizontal and vertical rails 14 affixed more deeply into left side 92 and right side 94. In this embodiment as well as that of fitting kit 94, the top flanges 96 of rails 14 help to hold cables 46 in place.

Figure 10B:
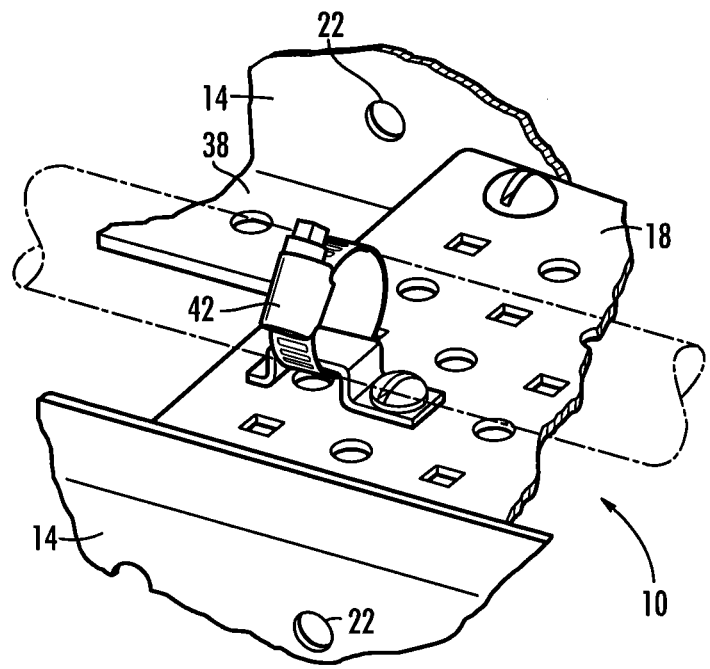
Figure 10C:
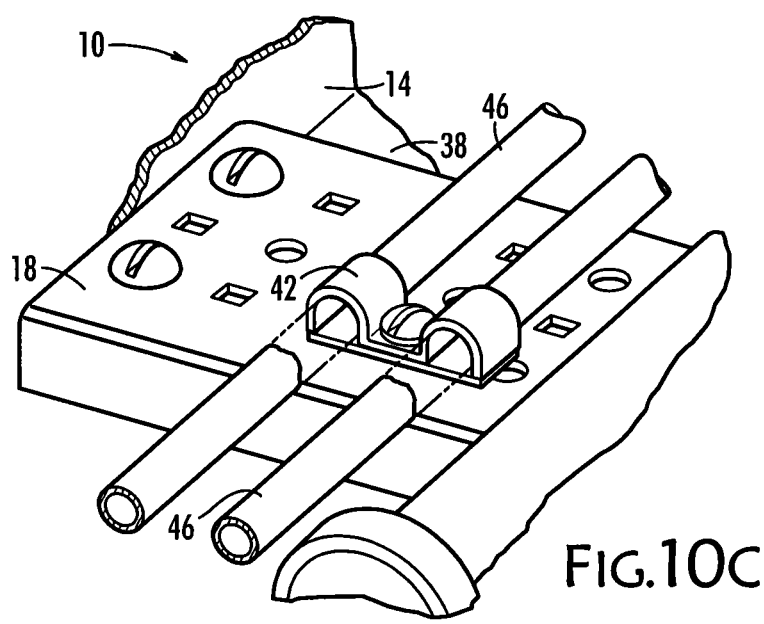

FIG. 10A shows different types of cables 46, namely, pipes with elbow fittings 82 secured to rungs 18 by clamps 42. Both FIGS. 5C and 10A show rungs 18 mounted on top of ledges 38 of vertical and horizontal rails 14 of third fitting kit 90. FIGS. 10B and 10C show details of FIG. 10A of clamps 42

In the case of each of first, second and third vertical fitting kits 72, 84, 90, left and right sides are symmetric and flat and can be easily stacked so as to use minimal volume for packing, storing shipping and staging.

An alternative to a vertical fitting kit is a horizontal elbow joint for 90-degree horizontal bends, as shown in FIGS. 6A and 6B. Here, horizontal elbow joint has an inside elbow bend 102 and an outside elbow bend 104, which are L-shaped or it may have only one of these. Inside and outside elbow bends 102, 104, are bolted rails 14 at opposing ends of each elbow 102, 104.

Inside and outside elbows 102, 104, have flanges 110, 112, extending respectively toward the center of the bend and which flanges 110, 112, are joined together by a diagonal rung 116 bolted to each tab 110, 112. Additional rungs 18 may be used on either the entrance to or exit from a horizontal elbow kit 100 for support near the 90 degree horizontal transition. The angle of the bend may be less than 90 degrees when required.

Figure 7:
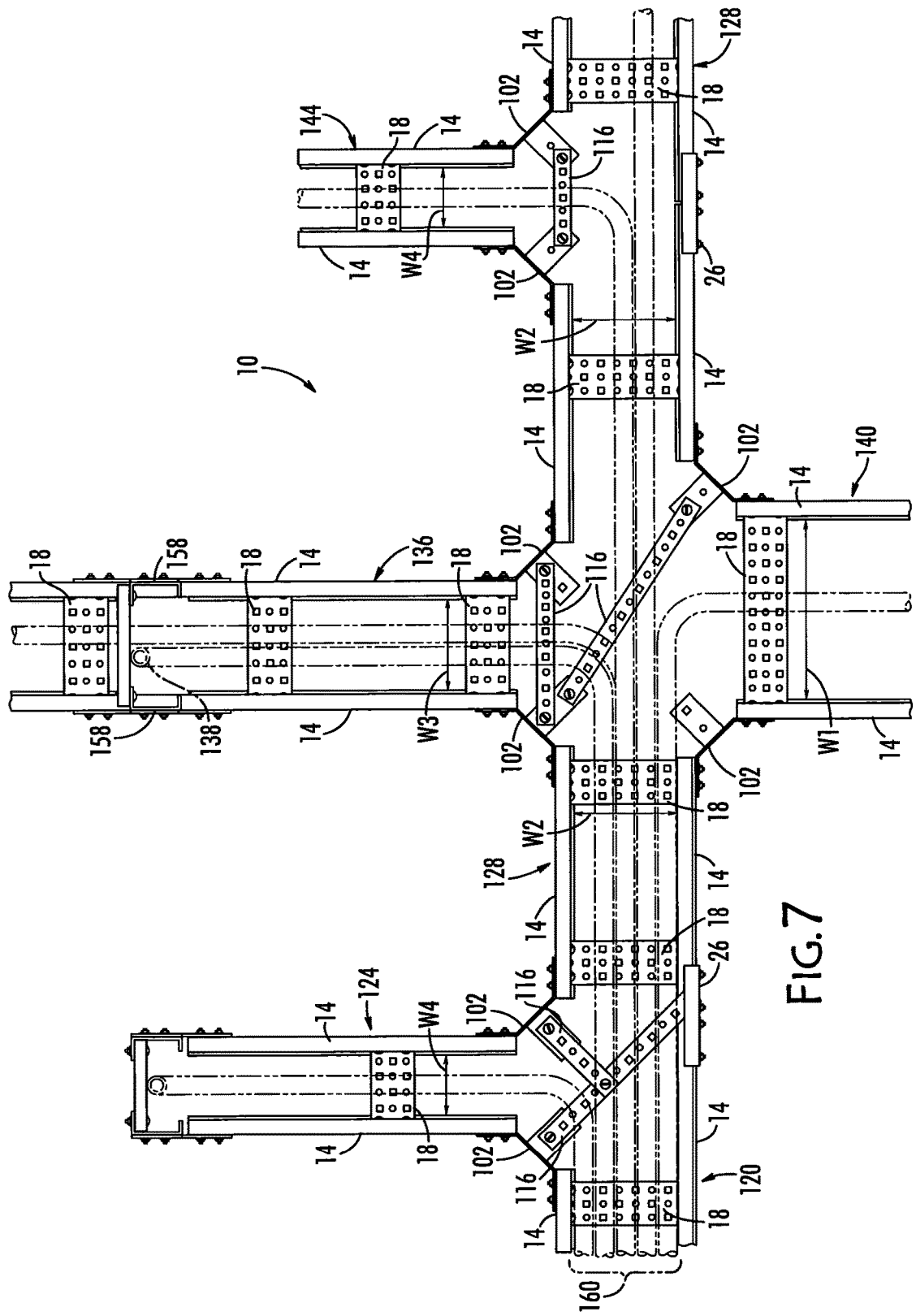
FIG. 7 illustrates a top view of a portion of a cable tray having a main tray and several trays exiting from the main tray laterally, according to an embodiment of the invention.

Referring now to FIG. 7, there is illustrated in a top view an example of a cable tray set 120 with several trays joining to it laterally and one joining vertically. Cable tray set 120 comprises spaced-apart rails 14 and spaced apart rungs 18 connected to rails 14. A first lateral tray 124 joins a second, main cable tray 128 using two 90 degree horizontal inside elbow bends 102. Three additional lateral trays 136, 140 and 144 join main cable tray 128 from opposing sides of main cable tray 128 using pairs of inside elbow bends 102. One cable 138 runs vertical off of lateral tray 136. Cables 160 may be arranged on main cable tray 128 so that they depart, if at all, from the others on main cable tray 128 in order, that is, from the first to depart to lateral tray 136 being the left-most cable, the second to depart to lateral tray 140 being the second-leftmost cable, and so on. Diagonal rungs 116 (see also FIG. 6B) provide additional support for the cables that pass through or bend away from the intersections of main cable tray 128 to lateral trays 124, 136, 140, and 144. A vertical fitting kit 158 is used to turn cable 138 in a vertical direction of second lateral tray 136.

It will be clear that numerous vertical fitting kits can also be combined with horizontal elbow fitting kits to have cables join or depart the main set of cables in either horizontal or vertical directions as needed and where needed. The use of rungs 18 in combination with rails 14 permits vertical up and down departures of, say, a portion of the cables through the gaps between rungs 18 as the remainder of the cables continue to the next rung 18.

Figure 8:
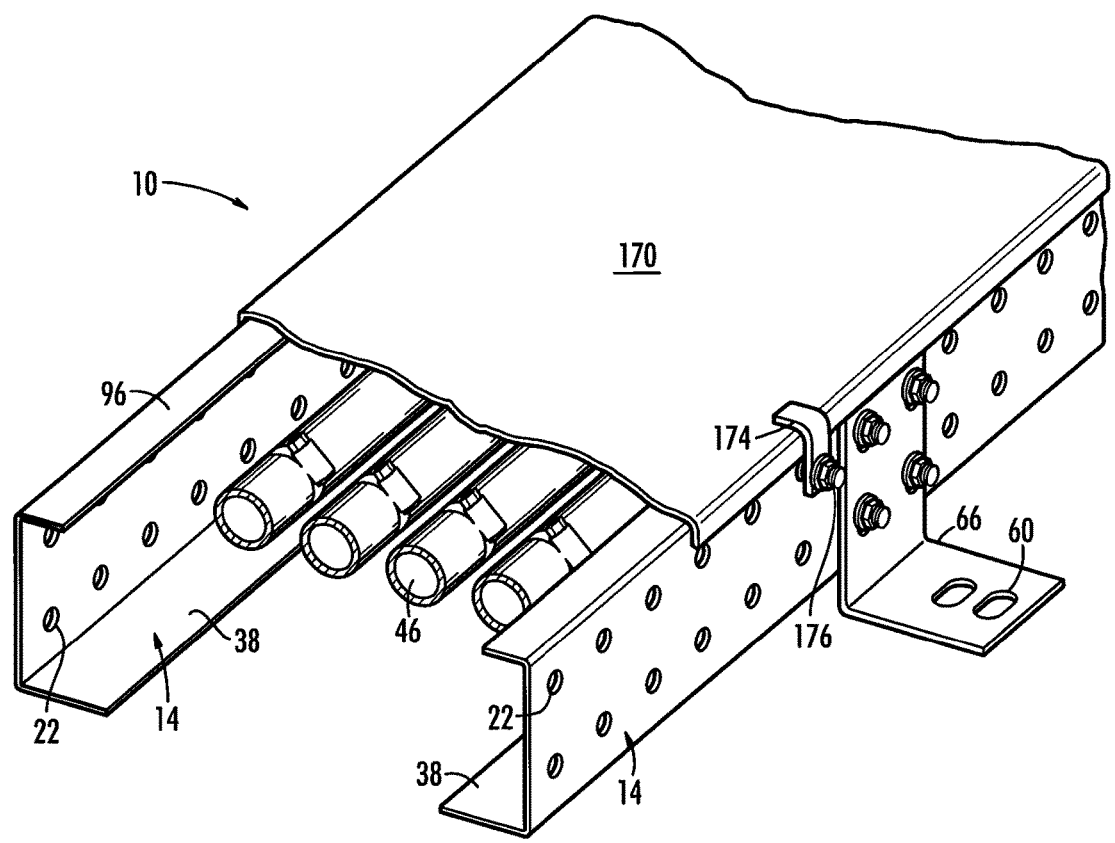
FIG. 8 illustrates a cover with hold down clamps on a section of cable tray according to an embodiment of the invention.

Referring now to FIG. 8, there is illustrated a cable tray 10 with a cover 170 for us when the cables on the cable tray 10 need to be protected from rain or heat from above. Simple clips 174 may be used to hold cover fast to rails 14 using a bolt 178 attached to a hole 22 in rail 14 and be easily loosened for servicing.

FIG. 9A-9H show rung material in both channel and flat cross sections, of different widths, and having different patterns of holes that permit easy attachments of various cable clamps 42 to be made. All may be used with spacers as shown in FIGS. 3A-3C.

Figure 9A:
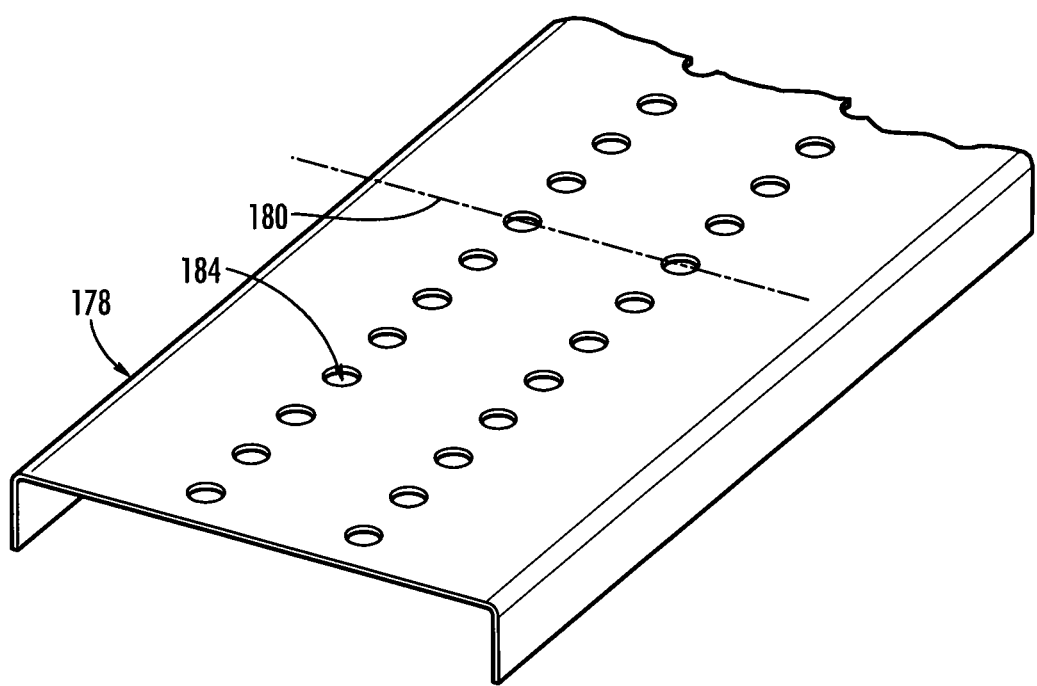
FIGS. 9A-9H illustrate examples of different rung material with different hole patterns for use with the present cable tray system, according to an embodiment of the invention.

FIG. 9A illustrates wide channel-type rung material 178. Rung material 178 has rows 180 of round holes 184. Any division of rung material 178 perpendicular to its major dimension to form a rung 18 will leave row 180 of at least two round holes 184 near the edge defined by the division.

Figure 9B:
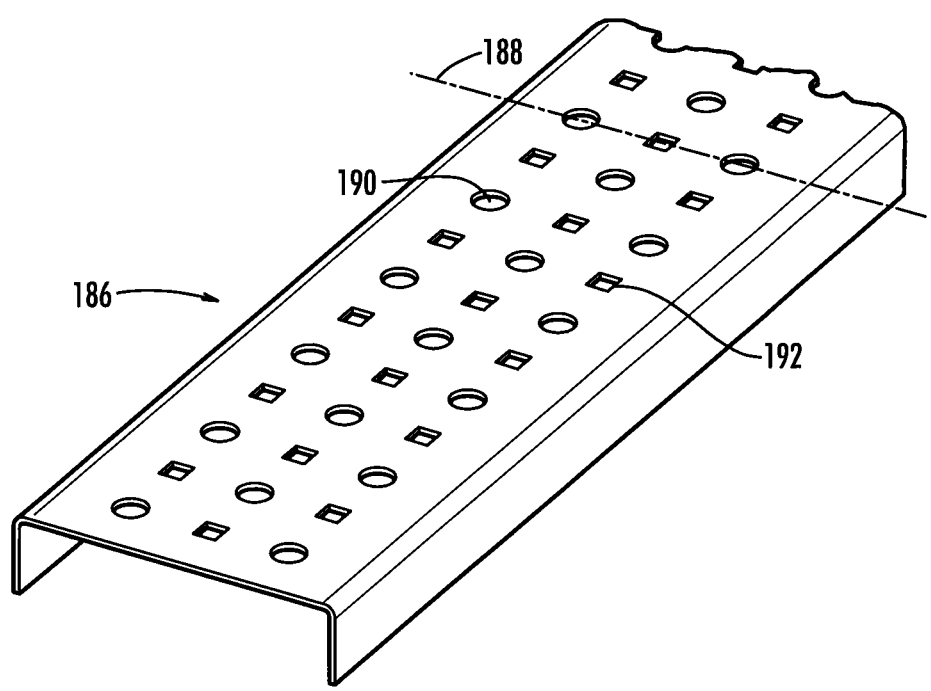

FIG. 9B illustrates narrow channel-type rung material 186. Rung material has rows 188 of round holes 190 and square holes 192. Any division of rung material 186 perpendicular to its major dimension to form a rung 18 will leave row 188 of at least two round holes 190 near the edge defined by the division.

Figure 9C:
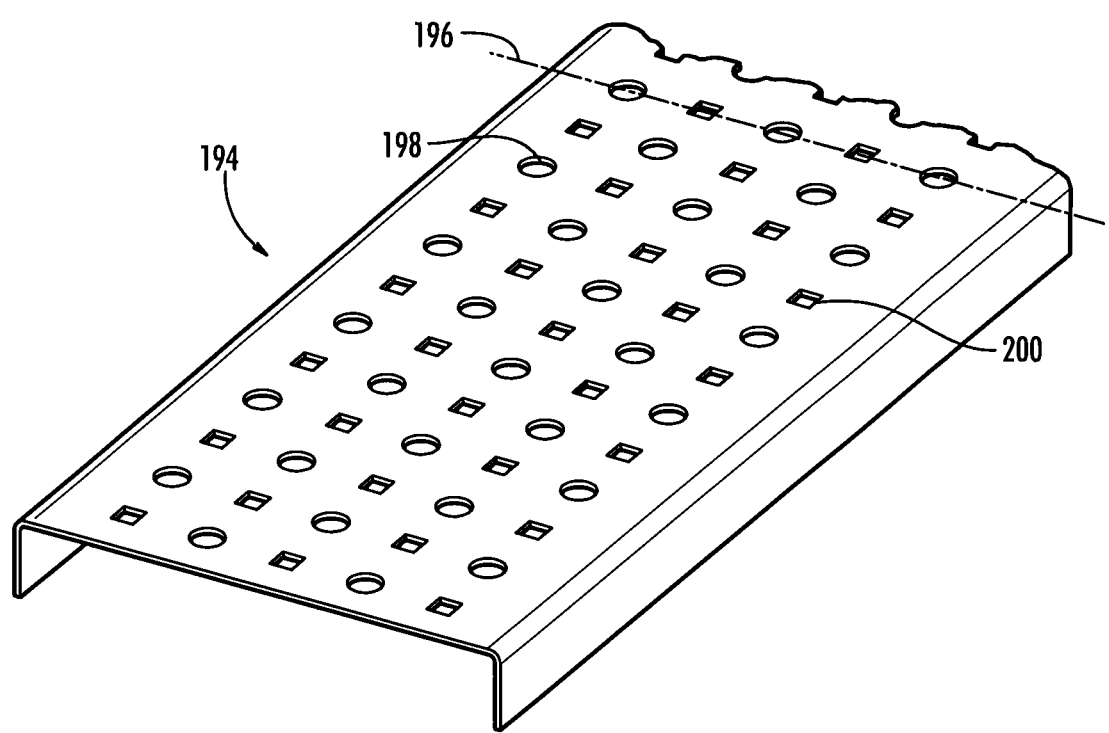
Figure 9D:
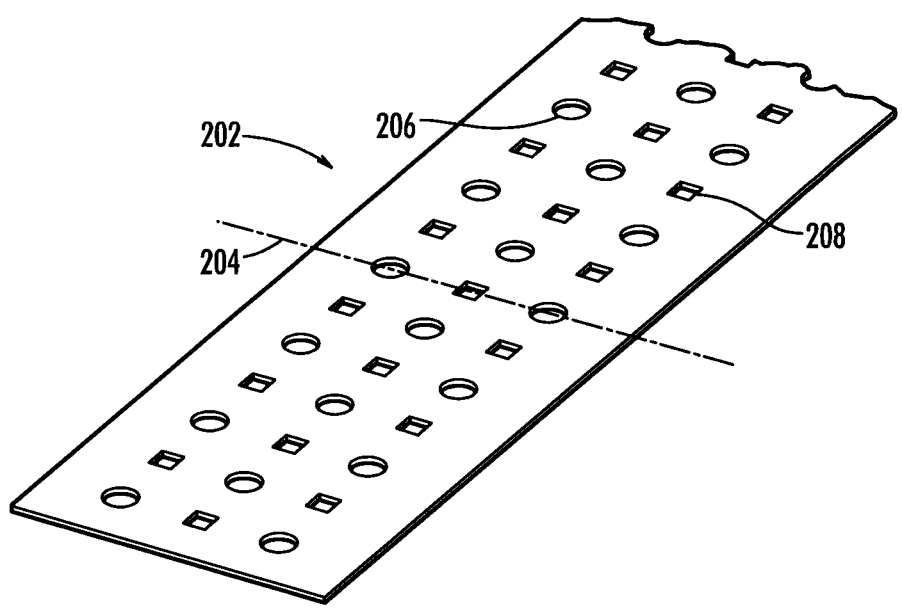
Figure 9E:
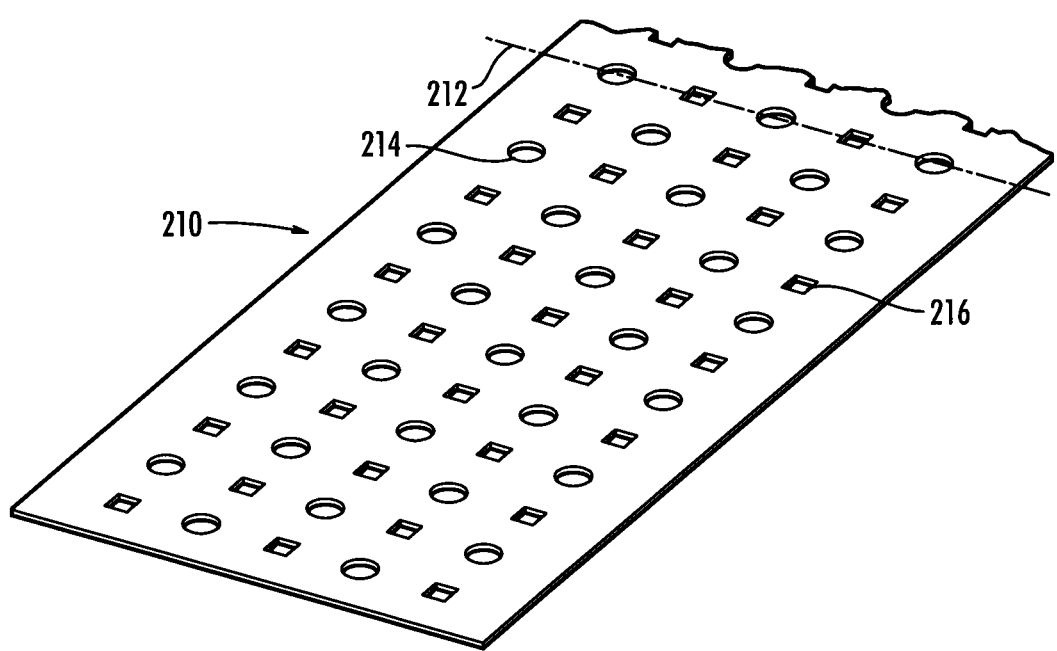
Figure 9F:
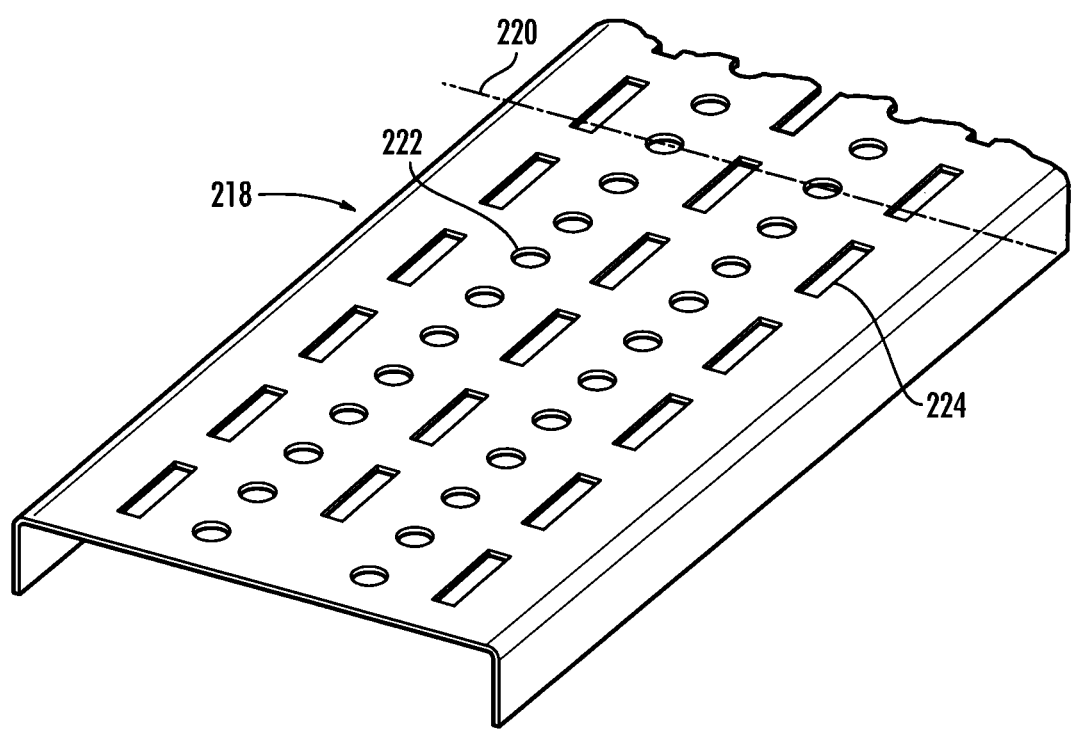
Figure 9G:
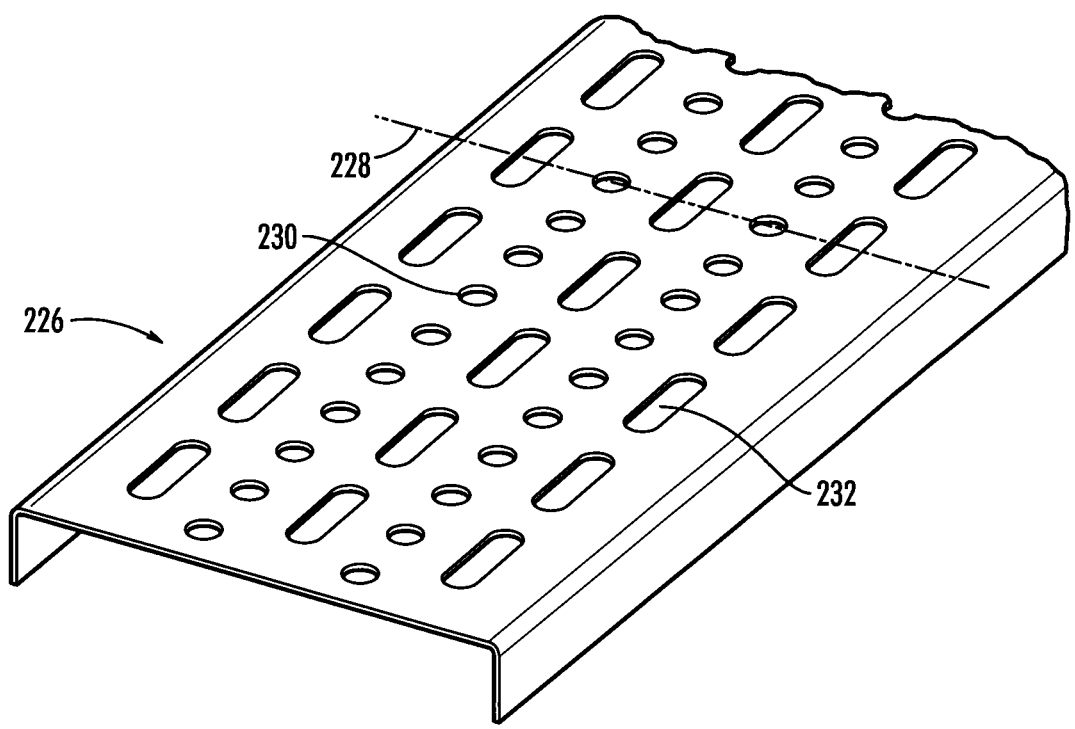
Figure 9H:
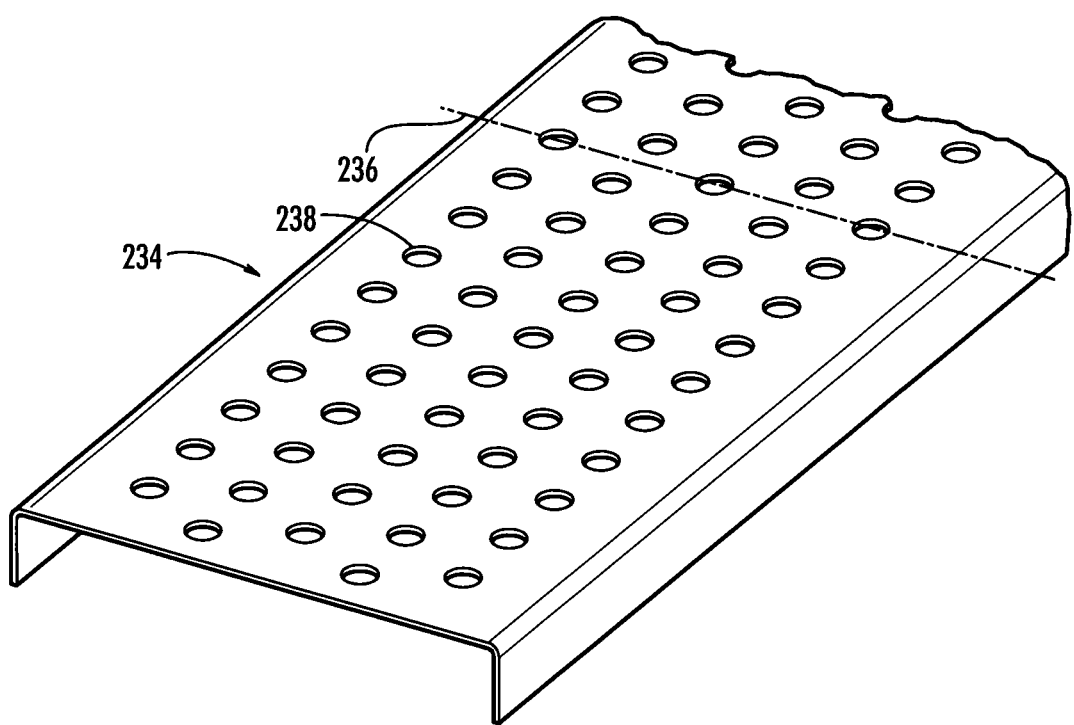

FIG. 9C illustrates wide channel-type rung material 194. Rung material 194 has rows of round holes 198 and square holes 200. Any division 196 of rung material 194 perpendicular to its major dimension to form a rung will leave a row of at least two round holes 198 near the edge defined by the division.

Various cable supports will require 5 cm (2 in.) center to center spacing in the attachments can be used easily without modification of the components of the kit and provide good metal-to-metal contact and secure attachment.

Certain of the elements described above come in fixed lengths which may be cut to fit at the job site, including rails 14, rods 58 for hanger brackets 54, rungs 18, diagonal rungs 116, and covers 170. Other components, including splice connectors 26, hanger brackets 54, channel hold down brackets 66, vertical fitting kits (with and without gussets) 72, 84, 90, horizontal elbow fitting kits 100, hold down clamps for covers 174, cable clamps 42, and all fasteners, are pre-cut and pre-formed.

Some components come in several sizes and shapes such as rungs 18, rails 14, splice connectors 26. Rails 14, may be C-shaped or L-shaped, and their upper flanges, if present, may be shorter than ledges 38. Horizontal elbow kits 100 nominally are available for 90 degree bends but may be available for bends of other angles and may be provided in various sizes.

Those skilled in cable tray design and construction will understand that various modifications and substitutions may be made in the foregoing preferred embodiments without departing from the spirit and scope of the present invention, which is defined by the appended claims.

What is claimed is:

1. A cable tray system, comprising:
    (a) plural rails, each rail of said plural rails having a ledge;
    (b) rung material configured for dividing into plural rungs, each rung of said plural rungs configured for joining two spaced-apart rails of said plural rails, said each rung being connectable to said ledge of said each rail of said two spaced-apart rails, said each rung, when connected to said two spaced-apart rails, being connected so as to be spaced apart from adjacent rungs;
    (c) plural splice connectors, each splice connector of said plural splice connectors for joining said two rails of said plural rails at a zero-degree angle when said two rails are placed end to end;

(d) plural fittings, each fitting of said plural fittings for joining said two rails of said plural rails at greater than a zero-degree angle when said two rails are placed end-to-end;

(e) plural inside elbows, each inside elbow of said plural inside elbows for joining said two rails of said plural rails at an angle greater than zero degrees when said two rails are placed end-to-end;

(f) plural outside elbows, each outside elbow of said plural outside elbows for joining said two rails of said plural rails at an angle greater than zero degrees when said two rails are placed end-to-end;

(g) plural fasteners for fastening said plural rails, said plural rungs, said splice connectors, and said plural fittings to each other to form a cable tray, wherein a cable tray in up to three dimensions and with plural paths is configurable from said plural rails, said plural rungs, said splice connectors, said plural fittings, said plural inside and outside elbows, and said fasteners, and wherein both said ledge of said each rail and said each rung has plural holes formed therein for receiving fasteners of said plural fasteners for connecting said each rung to said ledge of said each rail, said plural holes being formed in said each rung and said each ledge so that two holes of said plural holes in said each rung and two holes of said plural holes in said ledge can be placed in registration with each other, thereby defining two registered pairs of holes, each pair of said two registered pairs to receive one fastener.

2. The cable tray system of claim 1, wherein said each inside elbow includes a tab and said outside elbow includes a tab, and wherein each rung of said plural rungs has a first end and a second end, said first end being connectable to said tab of said inside elbow and said second end being connectable to one of said tab of said outside elbow, said ledge of said each rail and to another rung of said plural rungs.

3. The cable tray system of claim 1, wherein each rail of said plural rails has an L-shape or a C-shape cross section.

4. The cable tray system of claim 1, wherein said rung material has a C-shaped cross section.

5. The cable tray system of claim 1, further comprising plural spacers, each spacer of said plural spacers configured to space each rung of said plural rungs with respect to said rails of said plural rails when being connected to said two rails.

6. The cable tray system of claim 1, wherein said fasteners include bolts.

7. The cable tray system of claim 1, wherein each rail of said plural rails nests within each splice connector.

8. The cable tray system of claim 1, wherein each fitting of said plural fittings is configured to support cable in a change of direction between a horizontal plane and a vertical plane.

9. The cable tray system of claim 8, wherein said each fitting of said plural fittings include a left side and right side, that, when said left and right fittings are joined spaced apart rails, transition said cable tray system between said horizontal and said vertical planes.

10. The cable tray system of claim 9, wherein said each left side and said right side of said each fitting is L-shaped and flat.

11. The cable tray system of claim 10, wherein said each left side and each right side of said each fitting is each configured to connect to two rails of said plural rails that are oriented 90 degrees with respect to each other.

12. The cable tray system of claim 11, wherein said each left side and right side of said each fitting includes a gusset.

13. The cable tray system of claim 12, wherein said left side and said right side of said each fitting have plural holes formed therein, each hole of said plural holes being spaced apart from another hole of said plural holes, said each hole and each another hole being spaced to be in registration with any two holes of said holes in said ledge of said each rail, so that said each rail may be connected to said left side and said right side of said each fitting.

14. The cable tray system of claim 1, further comprising hanger brackets.

15. The cable tray system of claim 1, further comprising support brackets.

16. The cable tray system of claim 1, further comprising plural cover panels.

17. The cable tray system of claim 1, further comprising plural clamps.

18. The cable tray system of claim 1, wherein said rung material has a pattern of holes formed therein.

19. The cable tray system of claim 18, wherein said pattern of holes has plural rows of holes with at least two holes in each row of holes presented when said rung material is divided into plural rungs.

20. A cable tray system, comprising:

(a) plural rails, each rail of said plural rails having a ledge;

(b) rung material configured for dividing into plural rungs, each rung of said plural rungs configured for joining two spaced-apart rails of said plural rails, said each rung being connectable to said ledge of said each rail of said two spaced-apart rails, said each rung, when connected to said two spaced-apart rails, being connected so as to be spaced apart from adjacent rungs;

(c) plural splice connectors, each splice connector of said plural splice connectors for joining said two rails of said plural rails at a zero-degree angle when said two rails are placed end to end;

(d) plural fittings, each fitting of said plural fittings for joining said two rails of said plural rails at greater than a zero-degree angle when said two rails are placed end-to-end;

(e) plural inside elbows, each inside elbow of said plural inside elbows for joining said two rails of said plural rails at an angle greater than zero degrees when said two rails are placed end-to-end;

(f) plural outside elbows, each outside elbow of said plural outside elbows for joining said two rails of said plural rails at an angle greater than zero degrees when said two rails are placed end-to-end;

(g) plural fasteners for fastening said plural rails, said plural rungs, said splice connectors, and said plural fittings to each other to form a cable tray, wherein a cable tray in up to three dimensions and with plural paths is configurable from said plural rails, said plural rungs, said splice connectors, said plural fittings, and said plural inside and outside elbows, and said fasteners wherein said each inside elbow includes a tab and said outside elbow includes a tab, and wherein each rung of said plural rungs has a first end and a second end, said first end being connectable to said tab of said inside elbow and said second end being connectable to one of said tab of said outside elbow, said ledge of said each rail and to another rung of said plural rungs.

21. A cable tray system, comprising:
(a) plural rails, each rail of said plural rails having a ledge;
(b) rung material configured for dividing into plural rungs, each rung of said plural rungs configured for joining two spaced-apart rails of said plural rails, said each rung being connectable to said ledge of said each rail of said two spaced-apart rails, said each rung, when connected to said two spaced-apart rails, being connected so as to be spaced apart from adjacent rungs;
(c) plural splice connectors, each splice connector of said plural splice connectors for joining said two rails of said plural rails at a zero-degree angle when said two rails are placed end to end;
(d) plural fittings, each fitting of said plural fittings for joining said two rails of said plural rails at greater than a zero-degree angle when said two rails are placed end-to-end, said each fitting having a left side and a right side;
(e) plural inside elbows, each inside elbow of said plural inside elbows for joining said two rails of said plural rails at an angle greater than zero degrees when said two rails are placed end-to-end;
(f) plural outside elbows, each outside elbow of said plural outside elbows for joining said two rails of said plural rails at an angle greater than zero degrees when said two rails are placed end-to-end;
(g) plural fasteners for fastening said plural rails, said plural rungs, said splice connectors, and said plural fittings to each other to form a cable tray,
    wherein a cable tray in up to three dimensions and with plural paths is configurable from said plural rails, said plural rungs, said splice connectors, said plural fittings, and said plural inside and outside elbows, and said fasteners
wherein said left side and said right side of said each fitting includes a gusset, and
wherein said left side and said right side of said each fitting have plural holes formed therein, each hole of said plural holes being spaced apart from another hole of said plural holes, said each hole and each another hole being spaced to be in registration with any two holes of said holes in said ledge of said each rail, so that said each rail may be connected to said left side and said right side of said each fitting.

* * * * *